(12) United States Patent
Bergenwall et al.

(10) Patent No.: US 6,292,891 B1
(45) Date of Patent: Sep. 18, 2001

(54) METHOD OF CONNECTING BASE STATION TO CELLULAR SYSTEM

(75) Inventors: Martin Bergenwall, Espoo; Juha Pirkola, Helsinki, both of (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/589,998

(22) Filed: Jun. 8, 2000

Related U.S. Application Data

(63) Continuation of application No. PCT/FI99/00004, filed on Jan. 5, 1999.

(51) Int. Cl.$^7$ ..................................................... G06F 1/26
(52) U.S. Cl. ........................... 713/151; 713/164; 713/168; 380/247
(58) Field of Search .................................. 713/151, 164, 713/165, 168; 380/247

(56) References Cited

U.S. PATENT DOCUMENTS

| | | | | |
|---|---|---|---|---|
| 5,608,780 | * | 3/1997 | Gerszberg et al. ................... | 455/436 |
| 6,118,775 | * | 9/2000 | Kari et al. ............................. | 370/349 |
| 6,122,527 | * | 9/2000 | Robinson et al. .................... | 455/557 |
| 6,125,110 | * | 9/2000 | Proctor et al. ........................ | 370/331 |

FOREIGN PATENT DOCUMENTS

| | | |
|---|---|---|
| 921035 | 9/1993 | (FI) . |
| 94700 | 6/1995 | (FI) . |
| 98031 | 7/1995 | (FI) . |
| 102232 B | 7/1997 | (FI) . |

\* cited by examiner

*Primary Examiner*—Thomas R. Peeso
(74) *Attorney, Agent, or Firm*—Altera Law Group, LLC

(57) ABSTRACT

The invention relates to a cellular radio network and a method of connecting a base station (100) to a cellular radio system, which enable a fast and automatized installation of base stations wherever an IP information network is available, the cellular radio system comprising a base station system which comprises as network elements a base station controller (102) and at least one base station, and in which method the base station controller controls at least one base station. The invention is characterized in that the network elements (102,100) are interconnected by an information network using a packet protocol, and that each network element is provided with a unique network element address, and that the network configuration information of said information network using the packet protocol is maintained at a configuration server (104) connected to the information network, and that a new base station connected to the network first contacts the configuration server, and that the configuration server transmits the network configuration information to the base station.

20 Claims, 3 Drawing Sheets

METHOD OF CONNECTING BASE STATION TO CELLULAR SYSTEM

This application is a continuation of international application serial number PCT/FI99/00004, filed Jan. 5, 1999.

FIELD OF THE INVENTION

The invention relates to a cellular radio system comprising a base station system which comprises a base station controller and at least one base station as network elements, and in which cellular radio system the base station controller is arranged to control at least one base station.

The invention further relates to a method of connecting a base station to a cellular radio system comprising a base station system which comprises a base station controller and at least one base station as network elements, and in which method the base station controller controls at least one base station.

BACKGROUND OF THE INVENTION

Demands made upon data transmission systems are on the increase. This concerns particularly wireless digital data transmission systems, such as cellular radio systems, which are expected to produce increasingly complex services, for example various data services.

A typical cellular radio system comprises a fixed base station network in which a subscriber terminal communicates with one or more base stations of the system. Furthermore, the cellular radio system comprises a base station controller which controls the base stations, and a mobile services switching centre. In connection with the cellular radio system, it has been known to connect a plurality of base stations of the cellular radio system so as to enable a plurality of base stations to be controlled by one base station controller by means of telecommunication connections by fixed connections, such as cabling or fixedly installed radio links.

It is previously known that a transmission connection between network elements is typically implemented using a 2Mbit/s connection, i.e. a PCM (Pulse Coded Modulation) link. At worst, the 2 Mbit/s PMC link used by the operator for transmission is so occupied that the increase in capacity mentioned above would require a new PCM link to be introduced. This would be both expensive and difficult.

The prior art solutions allow the number of telecommunication connections between the base stations in a network, i.e. the network configuration, to be manually changed in such a manner that the maintenance personnel visits all base stations to be changed. This is laborious, and such a prior art system does not enable the structure of the network to be flexibly changed. For example, it is thus impossible to change the transmission capacity of different base stations daily according to the base station which has the heaviest traffic. It would be most desirable that mobile telephone operators in urban and suburban areas should have such a characteristic.

Another disadvantage of the prior art system is that owing to the manual configuration of the network transmission connections, the prior art network is difficult to manage since the network cannot be managed from one point but the base stations have to be separately visited when the network configuration is to be changed.

BRIEF DESCRIPTION OF THE INVENTION

An object of the invention is to provide a cellular radio system so as to solve the problems described above. This can be achieved by a cellular radio system of the type described in the introduction, which is characterized in that in the cellular radio system, the network elements are connected by an information network using a packet protocol.

Another object of the invention is also to provide a method of installing a base station in a cellular radio system so as to solve the above problems. This, again, can be achieved by a method of the type described in the introduction, which is characterized in that the network elements are interconnected by means of an information network using a packet protocol, and that each network element is provided with a unique network element address, and that the network configuration information of said information network using the packet protocol is maintained at a configuration server connected to the information network, and that a new base station connected to the network first contacts the configuration server, and that the configuration server transmits the network configuration information to the base station.

The preferred embodiments of the invention are disclosed in the dependent claims.

Packet switching is a method in which a connection between users is established by transmitting data as packets which, in addition to the actual data, comprise address data and control data. Several connections can use the same transmission connection simultaneously. In recent years, research has been carried out on the use of packet switched radio systems particularly for transmitting data. It is unnecessary to allocate a data transmission connection. for the whole time, only for transmitting packets. This results in considerably lower costs and a smaller capacity need both when a network is being built and used.

The invention is based on the idea that a base station system uses data transmission based on a packet protocol, such as an Internet protocol (IP), and that the base station system comprises auto configuration base stations. The system comprises known network elements, such as base stations, base station controllers and a mobile services switching centre, which use an Internet protocol, i.e. an IP information network, and a new network element, i.e. a configuration server. When a new base station is connected to the network, it first contacts the configuration server in order to obtain the network configuration information, i.e. the IP address information of the nearest base station controller and other relevant network elements. The geographical coordinates of the base station can be fed into the base station while it is being installed, whereupon they are transmitted to the configuration server at a stage when the base station is introduced. The configuration server can also directly estimate the location of the base station from its IP address. When the base station has the IP information network address of the nearest base station controller, it can establish O&M (Operation and Maintenance) and signaling connections to the base station controller, which thus starts controlling the base station in a known manner. The base station controller can also utilize the information on the location of the base station in order to allocate radio frequencies to the base station.

Several advantages can be achieved by the cellular radio system and method of installing a base station in a cellular radio system of the invention. The cellular radio system and method of installing a base station in a cellular radio system enable a fast and automatized installation of base stations wherever an IP information network is available. By means of an IP-based autoconfigurating base station, the mobile communication network can be temporarily extended without an actual network extension. This is extremely useful for instance in connection with big concerts, sport events, conferences and other events in which people are congregated in a small area for a relatively short time. An existing IP-based network structure can also be utilized when a new information network is being built. Hence, it can be utilized for cellular network elements.

Furthermore, an advantage of the invention is that a base station becomes quicker and easier to install since the number of procedures that the base station installer must perform can be reduced and automatized. In addition, the base station installer does not have to know the structure of the entire base station network. The system and method of the invention reduce errors and erroneous functions in the base station network.

BRIEF DESCRIPTION OF THE DRAWINGS

The invention is now described in closer detail in connection with the preferred embodiments of the invention with reference to the accompanying drawings in which.

DETAILED DESCRIPTION OF THE INVENTION

The invention will be described below by way of example by means of a GSM network without restricting thereto, however.

Figure 1:
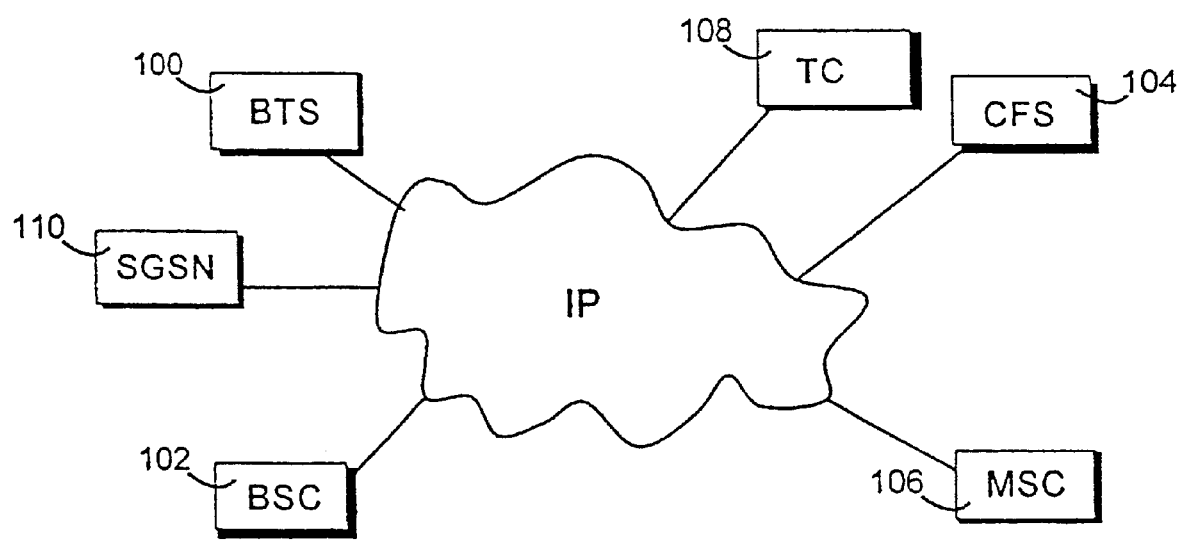
FIG. 1 shows an IP-based cellular radio system with autoconfigurating base stations.

FIG. 1 shows an IP-based cellular radio system which comprises a base station system (BSS, Base Station Subsystem). As network elements, the base station system comprises a base station controller (BSC) 102 and at least one base station (BTS, Base Transceiver Station) 100. In the cellular radio system, the base station controller 102 is arranged to control at least one base station 100. Most preferably, the information network using a packet protocol is an Internet protocol, i.e. an IP information network, and the network element address is an IP information network address, i.e. an IP number.

The invention is based on the idea that a cellular radio system uses data transmission based on a packet protocol, such as an Internet protocol (IP). In the most preferred embodiment, at least the network elements 100 and 102 of the cellular radio system are connected by an information network using the packet protocol. The operation of the network elements is based on network configuration information and IP address information, in other words each network element has a unique network element address which is attached to packets to be transmitted and on the basis of which the information is transmitted to the correct network element. For example, the base station 100 needs the IP address information of the nearest base station controller 102 and other relevant network elements in order to be able to communicate with the network elements and both receive and transmit calls, Known network elements of the cellular radio system include the base station 100, the base station controller 102, a mobile services switching centre 106, a speech encoding unit (TC, Transcoder) 108, i.e. a transcoder unit, i.e. a TRAU (Transcoder/Rate Adaptor Unit) unit, and, as a new element in accordance with the invention, a configuration server (CFS) 104. These network elements utilize an Internet protocol, i.e. an IP information network 116.

The mobile services switching centre 106 is equipment which belongs to the mobile communication network and which relays teleconnections in the mobile communication network and, subsequently, to other telephone networks. The mobile services switching centre 106 usually serves to, for example, monitor and control the operation of the base station systems, observe the locations of the mobile stations in the mobile services switching centre area, maintain the connections and transmit them to other information networks, and route the calls. The mobile services switching centre 106 communicates with the base station controller 102, which, again, communicates with the base station. The physical connection of the cellular radio system can vary, in other words information can physically travel via different routes in the network, depending on which route happens to be free at a given moment, but the logical connection is always the IP network, i.e. the Internet protocol network 116. Hence, information always travels logically to the same address, independently of the route via which the information has arrived. The speech encoding unit 108 operates as a coding converter, in other words it encodes and decodes speech.

The base stations 100 of the cellular radio system network elements are autoconfigurating, in other words the functions are carried out automatically by which the system, i.e. the hardware configuration, is extended or downgraded, and different parts are changed and their allocation is identified. Parameters of each base station 100 to be manually set comprise the IP addresses. Such addresses include the unique IP address of the base station 100, the address being dependent on the location of the base station 100, and the geographical coordinates of the base station 100. The geographical coordinates of the base station 100 are transmitted to the base station controller 102 when the base station is being installed. The base station 100 also transmits its geographical coordinates to the configuration server 104 when the base station is put to use or the configuration server 104 determines the location of the base station 100 from the unique IP address of the base station. In the IP networks, a plurality of networks are interconnected. A default gateway is a connection from one network to another, in other words if information is to be transmitted to an element which is not in the same network, the information must first be transmitted to the default gateway which knows how to forward it on the basis of the IP address. The IP address of the configuration server 104 and the IP address of the default gateway are also manually set parameters.

In the cellular radio system of the invention, the unique geographical location of the base station 100 is most preferably determined by means of a satellite location determination system. One such satellite location determination system is a GPS (Global Positioning System) by means of which the geographical coordinates of the base station 100 can be obtained.

The cellular radio system thus comprises the configuration server 104 which is connected to the network elements by the information network using the packet protocol. When the base station 100 is connected to the IP information network 116, it becomes connected to the configuration server 104, whereby the base station 100 obtains necessary network information. Hence, it is the configuration server 104 of the network elements which is responsible for the automatic configuration of the base stations 100. The network information obtained by the base station 100 from the configuration server 104 includes the IP addresses of the mobile services switching centre 106, the base station controller 102 and the speech encoding unit 108.

If the system includes a radio service using a packet transmission, the cellular radio system then also includes a network element (SGSN, Serving GPRS Support Node) 110 of the radio system using the packet transmission. The configuration server 104 also transmits the IP address of this network element to the base station 100. The network element 110 of the radio system using packet transmission is responsible for mobility, signaling and routing data in the radio system.

When the base station 100 has the IP address of the nearest base station controller 102, the base station establishes O&M and signaling connections to the base station controller 102, which next starts controlling the base station 100 in a previously known manner. The signaling connection to the base station controller 102 exists as long as the base station 100 operates, while the connection between the base station 100 and the configuration server 104 is only a temporary one. The base station 100 transmits its coordinates to the base station controller 102. On the basis of the geographical location information, i.e. the coordinates, the base station controller 102 allocates a free radio channel for the base station 100, in other words allocates radio frequencies to the base station 100. The base station 100 thus contacts the base station controller 102 from which it receives software, radio parameters and network parameters.

Since the Internet protocol does not guarantee the quality of service (QoS), i.e. the combined effect of the parts of a service, which determines user satisfaction, the network has to be provided with a sufficient band width. The base station controller 102 monitors the traffic directed towards the base station 100, and if, in the operation of the base station 100 and on the connections between the network elements 100 and 102, delays occur which are longer than desired, in other words if a packet takes longer than a determined limit allows, for instance in view of call establishment or radio channel usage and various maintenance functions, the base station controller 102 refuses to establish more connections to the base station 100.

Figure 2A:
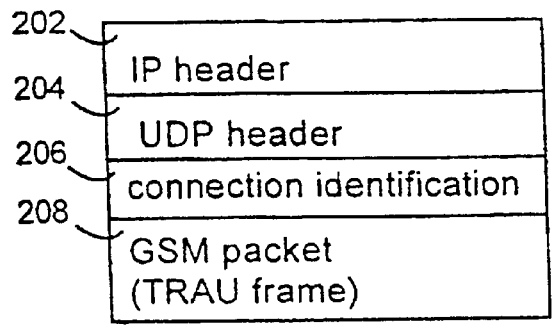
FIGS. 2a and 2b show by way of example unitdata packets of both speech and data packets.
Figure 2B:
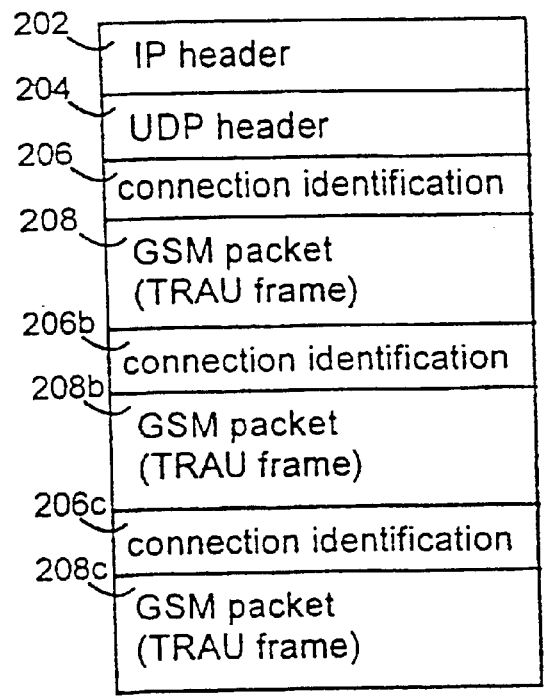

FIGS. 2a and 2b show by way of example unitdata packets of both speech and data packets. The speech and data packets coming from calls are transmitted in a UDP/IP unitdata packet. In the most preferred embodiment, several packets which arrive almost simultaneously can be transmitted in the same UDP/IP packet. The UDP/IP packet comprises an identifier for identifying the connection.

FIG. 2a shows an IP header 202, a UDP header 204, which is the identifier of a unitdata-based protocol associated with the TCP/IP protocols, a connection identifier, and a TRAU frame 208 of a GSM packet. The connection identifier 206 indicates to which call or connection the next GSM packet belongs, in other words, in the most preferred embodiment, the connection identifier 206 is a number, i.e. an identifier, which indicates to which call a speech packet belongs. Since a base station 100 is able to transmit several calls simultaneously, each call must be provided with an identifier which indicates to the other end to which call the packet belongs. To enable the packet to arrive at a correct network element in a correct manner, the packet must be provided with an address, i.e. a header. In the most preferred embodiment, the IP header includes the IP number of a receiver and the IP number of a transmitter. The UDP header, again, is the address of the UDP packet.

FIG. 2b shows an IP header 202, a UDP header 204, a connection identifier 206–206c and several TRAU frames 208–208c of a GSM packet. Several TRAU frames 208–208c can be transmitted at once in the GSM packet. Several connection identifiers 206–206c, which can be either identical or different within a packet, are thus also necessary. In the most preferred embodiment, a larger amount of information can be transmitted by transmitting several frames simultaneously as the transmission capacity is greater.

Since a common IP network has no data protection, it is necessary to provide some kind of protection or encryption. On connections between a configuration server 104, network elements 100, 102, 108 and 110, and a mobile services switching centre 106 at least some kind of encryption or eaves-dropping prevention is used. The connection between the base station 100 and the configuration server 104 must be data-protected. At least some kind of identification must also be used on connections between other network elements. Known encryption methods include a digital signature, the use of a key protocol and encryption, which prevents eaves-dropping and enables speech packets to be encrypted.

It is thus previously known that a transmission connection between network elements is implemented using a PCM (Pulse Coded Modulation) link. Since the capacity of PCM links is difficult to increase, in the solution of the invention, an IP network 116 is used on connections between common network elements, such as the base station 100 and the mobile services switching centre 106, in which case the mobile communication network can be temporarily extended without an actual network extension by means of the IP-based autoconfigurating base station 100, and an already existing IP-based network structure can thus be utilized when a new information network is built.

Figure 3:
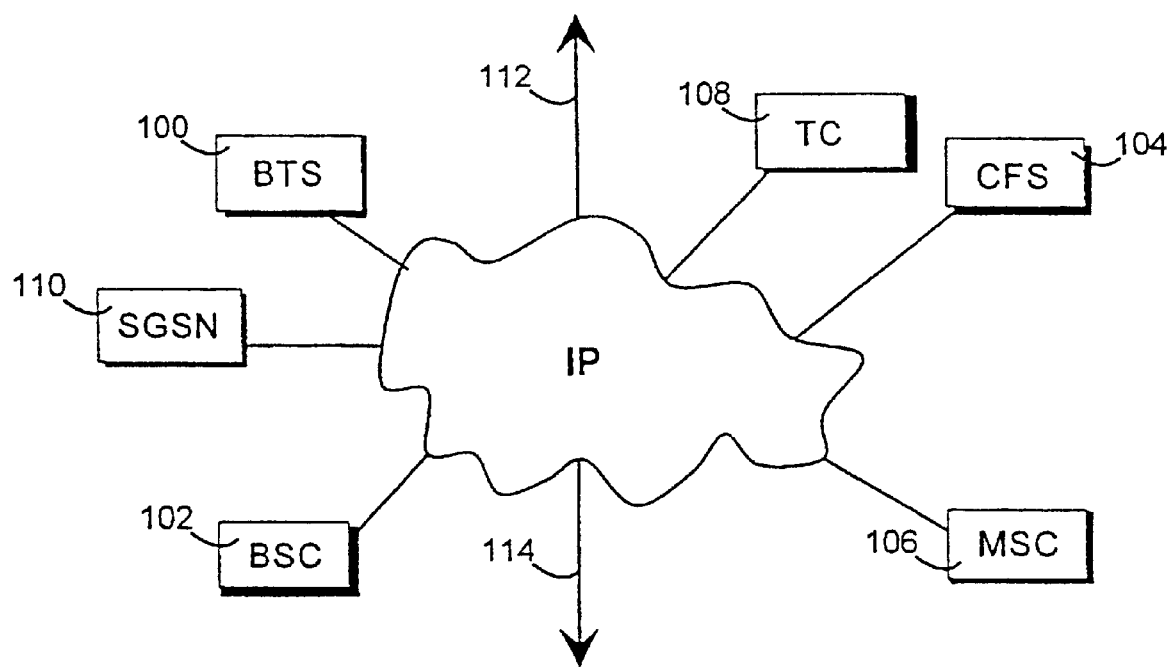
FIG. 3 shows an IP-based base station system also comprising a network connection to other information networks.

FIG. 3 shows an IP-based base station system which comprises network connections 112 and 114 also to other information networks. The base station system is thus a part of a larger entity. All network elements shown in the figure operate as described in connection with FIG. 1.

Although the invention is described above with reference to the example and GSM components in accordance with the accompanying drawings, it is obvious that the invention is not restricted thereto but it can be modified in various ways within the inventive idea disclosed in the attached claims, and the same leading principles can also be applied to other cellular networks, such as next generation networks (Universal Mobile Telecommunications System UMTS being planned) and IMT-2000 (International Mobile Telecommunications 2000).

What is claimed is:

1. A cellular radio system comprising:
   a base station system which comprises a base station controller and at least one base station as network elements, and in which cellular radio system the base station controller is arranged to control at least one base station, wherein in the cellular radio system, the network elements are connected by an information network using a packet protocol and at least one network element is autoconfigurating;
   a configuration server, connected to the network elements, by the information network using the packet protocol; and
   at least one base station is arranged to contact the configuration server and to load parameters from the configuration server into the base station.

2. The cellular radio network as claimed in claim 1, wherein the cellular radio network comprises as network elements a mobile services switching centre, a speech encoding unit and a radio system network element using packet transmission, which are connected to other network elements.

3. The cellular radio system as claimed in claim 1, wherein each network element has a unique network element address which is attached to packets to be transmitted and on a basis of which information is transmitted to the correct network element.

4. The cellular radio system as claimed in claim 3, wherein the unique network element address of each base station, network element address of the configuration server, unique geographical coordinates of each base station, network element address of a default gateway are set in the base station.

5. The cellular radio system as claimed in claim 1, wherein the information network using the packet protocol is an Internet protocol information network, and the network element address is an IP information network address.

6. A method of connecting a base station to a cellular radio system comprising:

a base station system which comprises a base station controller and at least one base station as network elements, and in which method the base station controller controls at least one base station, wherein the network elements are interconnected by means of an information network using a packet protocol, and that at least one network element is functioning autoconfigurously, and that each network element is provided with a unique network element address, and that the network configuration information of said information network using the packet protocol is maintained at a configuration server connected to the information network, and that a new base station connected to the network first contacts the configuration server, and that the configuration server transmits the network configuration information to the base station.

7. The method as claimed in claim 6, wherein the configuration server transmits the network element address of the nearest base station controller to the base station.

8. The method as claimed in claim 6, wherein at least one base station contacts the configuration server and loads parameters from the configuration server into the base station.

9. The method as claimed in claim 8, wherein the configuration server determines the location of the base station from the unique network element address of the base station.

10. The method as claimed in claim 6, wherein geographical coordinates of the base station are transmitted to the base station controller when the base station is installed.

11. The method as claimed in claim 10, wherein the base station transmits the base station's geographical coordinates to the configuration server when the base station is established.

12. The method as claimed in claim 10, wherein the base station controller uses the geographical coordinates in order to allocate radio frequencies to the base station.

13. The method as claimed in claim 6, wherein the base station establishes Operation and Maintenance and signaling connections to the base station controller.

14. The method as claimed in claim 6, wherein a mobile services switching centre serves to transmit connections of the cellular radio system in the information network.

15. The method as claimed in claim 6, wherein on connections between the configuration server, the network elements and mobile services switching centre, at least encryption or eavesdropping prevention is used.

16. The method as claimed in claim 6, wherein the base station controller stops contacting the base station if delays that are longer than desired occur on the connections between the network elements.

17. The method as claimed in claim 6, wherein speech and data packets are transmitted as unitdata packets.

18. The method as claimed in claim 17, wherein several speech and data packets which arrive at the same time can be transmitted in the same unitdata packet.

19. The method as claimed in claim 17, wherein an identifier has been attached to each speech and data packet in order to connect the packet to the correct connection.

20. The method as claimed in claim 6, wherein an Internet protocol information network, is used as the information network using the packet protocol, an Internet protocol information network address is used as the network element address, and a UDP/IP packet is used as the unitdata packet.

* * * * *